(12) United States Patent
Bell

(10) Patent No.: US 8,111,168 B2
(45) Date of Patent: Feb. 7, 2012

(54) SMOKE DETECTOR WITH INCLUDED FLAME BARRIER

(75) Inventor: Kenneth Frazer Bell, Raleigh, NC (US)

(73) Assignee: Kidde Technologies, Inc., Wilson, NC (US)

( * ) Notice: Subject to any disclaimer, the term of this patent is extended or adjusted under 35 U.S.C. 154(b) by 380 days.

(21) Appl. No.: 12/416,958

(22) Filed: Apr. 2, 2009

(65) Prior Publication Data

US 2010/0253528 A1 Oct. 7, 2010

(51) Int. Cl.
*G08B 17/10* (2006.01)

(52) U.S. Cl. .................. 340/628; 340/693.6; 340/693.5

(58) Field of Classification Search ............... 340/693.6, 340/693.5, 627, 628
See application file for complete search history.

(56) References Cited

U.S. PATENT DOCUMENTS

| | | | |
|---|---|---|---|
| 4,616,928 A | 10/1986 | Leavitt et al. | |
| 4,688,183 A | 8/1987 | Carll et al. | |
| 4,711,571 A | 12/1987 | Schuman | |
| 4,857,895 A | 8/1989 | Kaprelian | |
| 4,942,305 A | 7/1990 | Sommer | |
| 5,220,179 A | 6/1993 | Gagea | |
| 5,381,130 A | 1/1995 | Thuillard et al. | |
| 5,391,114 A | 2/1995 | DeGroot | |
| 5,821,865 A * | 10/1998 | Solak .......................... | 340/628 |
| 6,753,786 B1 | 6/2004 | Apperson et al. | |
| 7,483,139 B2 | 1/2009 | Powell | |

FOREIGN PATENT DOCUMENTS

| | | |
|---|---|---|
| ER | 0560030 A1 | 9/1993 |
| GB | 2212656 A | 7/1989 |
| GB | 2432884 A | 6/2007 |

OTHER PUBLICATIONS

European Search Report dated May 21, 2010.

* cited by examiner

*Primary Examiner* — Travis Hunnings
(74) *Attorney, Agent, or Firm* — Carlson, Gaskey & Olds, PC

(57) ABSTRACT

A smoke detector comprises a first housing to face an area in which to detect smoke, a second housing secured to the first housing, electronics to detect smoke within the area, and a flameproof barrier positioned between the first and second housings.

14 Claims, 1 Drawing Sheet

SMOKE DETECTOR WITH INCLUDED FLAME BARRIER

BACKGROUND OF THE INVENTION

This application relates to a smoke detector that includes a flame barrier to provide part of a flameproof barrier for use in an aircraft.

Aircraft typically include a flameproof barrier that surrounds a cargo compartment. The flameproof barrier is intended to provide a break between the cargo compartment and the more critical areas of the aircraft, such as the passenger compartment. Typically, the flameproof barrier may be provided by a fiberglass liner.

In addition, aircraft are typically provided with a smoke detector in the cargo compartment. Presently, the smoke detector is mounted to a wall portion. This wall portion is then mounted into a wall, and typically the ceiling of the cargo compartment. The portion of the wall is provided with its own flameproof barrier. A wire must extend from the smoke detector to a control outward of the cargo compartment. The wire extends through the wall portion through a small opening.

The above arrangement is complex, and requires a good deal of time to assemble.

SUMMARY OF THE INVENTION

A smoke detector comprises a first housing to face an area in which to detect smoke, a second housing secured to the first housing, electronics to detect smoke within the area, and a flameproof barrier positioned between the first and second housings.

These and other features of the present invention can be best understood from the following specification and drawings, the following of which is a brief description.

DETAILED DESCRIPTION OF THE PREFERRED EMBODIMENT

Figure 1:
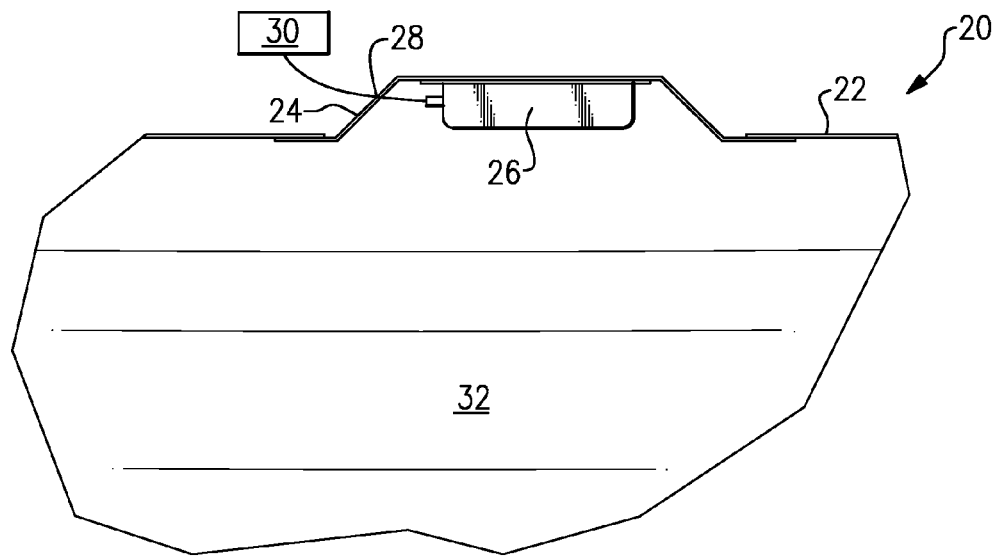
FIG. 1 shows a prior art arrangement.

FIG. 1 shows the existing aircraft 20 having a cargo compartment 32. A wall 22 is provided with a flameproof barrier, such as fiberglass, to prevent flames that may start in the cargo compartment 32 from passing across the wall 22.

In the prior art FIG. 1 arrangement, a pan 24 is attached to the wall 22. The smoke detector 26 is attached to the pan 24. A wire 28 extends through a small opening in the pan to communicate with a control 30 positioned outwardly of the cargo compartment 32. The pan 24 must be somehow attached to the wall 22, and is a relatively heavy component. As mentioned, the wall 22 is typically a ceiling of the cargo compartment 32. As mentioned above, the assembly of the several parts together is somewhat complex and cumbersome.

Figure 2:
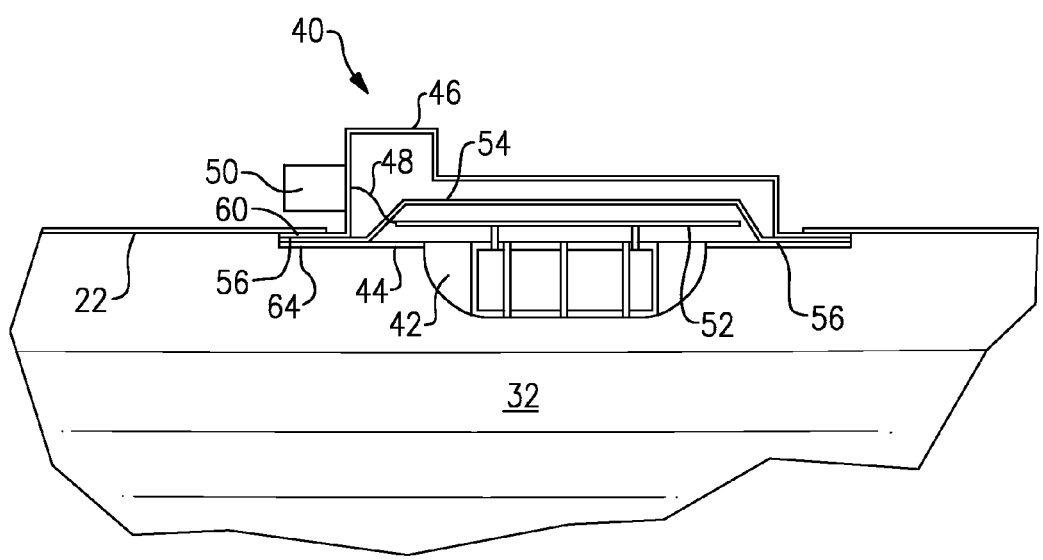
FIG. 2 shows the inventive arrangement.

FIG. 2 shows the inventive smoke detector 40. In the inventive smoke detector 40, the pan 24 is eliminated. Instead, a two-piece housing 44 and 46 sandwiches a flexible flameproof membrane 54. The housing 44 has an outer edge 64, and the housing 46 has an outer edge 60 that sandwiches the outer edge 56 of the flameproof barrier.

The flameproof barrier 54 overlaps with the flameproof barrier on wall 22. Thus, there is no need for mounting a separate pan within the wall 22, rather, the smoke detector 40 itself is simply mounted.

A circuit card 52 communicates by a wire 48 to a control 50, which is mounted on the upper housing 46. The circuit card 52, and the overall operation of the smoke detector 40 may be generally as known in the art.

In one embodiment, the flexible flameproof membrane 54 may be formed of a flame-stopping dot paper. The flame-stopping dot paper may be formed of non-woven ceramic materials. In one example, a paper available under the trade name Nextel™ 312 flame-stopping dot paper, and which is available from 3M Corporation may be utilized. However, other flameproof barriers may also be utilized.

With the inventive incorporation of the flameproof membrane between the housings, there is a much simpler assembly. Moreover, the heavy pan 24 is eliminated with a more lightweight housing.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A smoke detector comprising:
    a first housing to face an area in which to detect smoke;
    a second housing secured to said first housing;
    electronics to detect smoke within the area;
    a flameproof barrier positioned between said first and second housings; and
    said flameproof barrier being provided by a flexible membrane.

2. The smoke detector as set forth in claim 1, wherein outer edges of said first and second housings sandwich an outer edge of said membrane therebetween.

3. The smoke detector as set forth in claim 1, wherein said flexible membrane is formed of a paper.

4. The smoke detector as set forth in claim 3, wherein said paper is a flame-stopping dot paper.

5. The smoke detector as set forth in claim 3, wherein said paper is formed of non-woven ceramics.

6. The smoke detector as set forth in claim 1, wherein said electronics include a circuit card, with said circuit card being on a side of said flameproof barrier spaced toward the area.

7. The smoke detector as set forth in claim 1, wherein a wire extends from said electronics to a control, said control being mounted on said second housing.

8. An aircraft cargo hold comprising:
    a cargo hold wall provided with a flame barrier; and
    a smoke detector comprising a first housing to face the cargo hold, a second housing secured to said first housing, electronics to detect smoke within the area, and a flameproof barrier positioned between said first and second housings.

9. The aircraft cargo hold as set forth in claim 8, wherein said flameproof barrier is provided by a flexible membrane.

10. The aircraft cargo hold as set forth in claim 9, wherein outer edges of said first and second housings sandwich an outer edge of said membrane therebetween.

11. The aircraft cargo hold as set forth in claim 9, wherein said flexible membrane is formed of a paper.

12. The aircraft cargo hold as set forth in claim 11, wherein said paper is a flame-stopping dot paper.

13. The aircraft cargo hold as set forth in claim 11, wherein said paper is formed of non-woven ceramics.

14. The aircraft cargo hold as set forth in claim 8, wherein said electronics include a circuit card, with said circuit card being on a side of said flameproof barrier spaced toward the area.

* * * * *